United States Patent
Vockrodt et al.

(10) Patent No.: US 10,220,472 B2
(45) Date of Patent: Mar. 5, 2019

(54) MODELING OF LASER OUTPUT FROM A PULSED LASER TO ACHIEVE A CONSISTENT CUTTING PROCESS

(71) Applicant: Lasx Industries, Inc., St. Paul, MN (US)

(72) Inventors: Jason Vockrodt, St. Paul, MN (US); Matthew Hansen, St. Paul, MN (US); Kevin Klingbeil, St. Paul, MN (US)

(73) Assignee: Lasx Industries, Inc, St, Paul, MN (US)

( * ) Notice: Subject to any disclaimer, the term of this patent is extended or adjusted under 35 U.S.C. 154(b) by 554 days.

(21) Appl. No.: 14/609,544

(22) Filed: Jan. 30, 2015

(65) Prior Publication Data

US 2015/0212509 A1     Jul. 30, 2015

Related U.S. Application Data

(60) Provisional application No. 61/933,451, filed on Jan. 30, 2014.

(51) Int. Cl.
| | |
|---|---|
| *B23K 26/08* | (2014.01) |
| *B23K 26/00* | (2014.01) |
| *B23K 26/06* | (2014.01) |
| *B23Q 15/12* | (2006.01) |

(52) U.S. Cl.
CPC ...... *B23K 26/0869* (2013.01); *B23K 26/0006* (2013.01); *B23K 26/0626* (2013.01); *B23K 26/083* (2013.01); *B23Q 15/12* (2013.01); *G05B 2219/45041* (2013.01)

(58) Field of Classification Search
CPC ........... B23K 26/0689; B23K 26/0006; B23K 26/0626; B23K 26/083; B23K 11/00; B23K 26/206; G05B 2219/45041; H01M 2/08
See application file for complete search history.

(56) References Cited

U.S. PATENT DOCUMENTS

| | | | | |
|---|---|---|---|---|
| 5,656,186 A | * | 8/1997 | Mourou | A61B 18/20 219/121.69 |
| 6,676,878 B2 | * | 1/2004 | O'Brien | B23K 26/032 219/121.62 |
| 7,324,867 B2 | | 1/2008 | Dinauer et al. | |
| 2003/0136767 A1 | * | 7/2003 | Faitel | B23K 26/02 219/121.63 |
| 2005/0258152 A1 | * | 11/2005 | Kawamoto | B23K 26/03 219/121.62 |
| 2005/0279740 A1 | * | 12/2005 | Liu | B23K 26/032 219/121.69 |
| 2008/0264914 A1 | * | 10/2008 | Weick | B23K 26/046 219/121.78 |

\* cited by examiner

*Primary Examiner* — Brian Jennison
(74) *Attorney, Agent, or Firm* — Law Office of Scott C Harris, Inc

(57) ABSTRACT

Laser processing device and method that stores characterization information representing specifics of a specific laser used for processing a material and forms a model to control the laser based on the laser performance specifics. This control sets a spacing between leading edges of sequential pulses of optical energy output by the laser, that when output by the laser, creates a laser power output with a consistent amount of pulse overlap between the sequential pulses, e.g., 50% overlap. This control is specific to the specific laser and creates a very consistent processing using the laser, e.g., a cut.

26 Claims, 5 Drawing Sheets

US 10,220,472 B2

MODELING OF LASER OUTPUT FROM A PULSED LASER TO ACHIEVE A CONSISTENT CUTTING PROCESS

This application claims priority from provisional application No. 61/933,451, filed Jan. 30, 2014, the entire contents of which are herewith incorporated by reference.

BACKGROUND

Modern numerically controlled laser elements, and other machine controlled laser elements, may process materials at very high rates. The process velocity may be defined as the relative velocity that exists between the laser beam and the material being processed. It is desirable to make sure that the laser is processing the workpiece or material in the desired way.

However, the state-of-the-art of monitoring devices may not be able to accurately monitor such processes at these high process velocities. The sensors or feedback elements that currently exist are not sufficiently accurate to monitor these operations. Accordingly, prior art devices have often used highly trained technicians to set up and operate the process. These highly trained technicians are often very expensive. Even when such highly trained technicians are used, it still may be relatively difficult to monitor and accurately control the laser materials process.

Some processes, such as laser scoring, and other controlled depth processes which occur at even higher performance rates such as 20,000 mm/second of process velocity, may not be achievable at all with existing controllers. Scoring may involve varying the laser energy density at precise locations on the process material to achieve different score depths. The changes in laser power command may correspond to changes in the score depth. However, when this operation is occurring at very high process velocities, it may be difficult to compensate for the inherent delays and nonlinearities that exist in the laser, other components in the physical system, and the control elements to that physical system.

SUMMARY

The present invention is in the technical field of laser processing of a workpiece or material to change the material by cutting, scoring, scribing, welding, etching or otherwise processing the material.

When processing that is carried out is cutting, the cutting can be carried out to a controlled depth independent of material speed.

More particularly, the present invention defines modeling the output power of a laser at varying frequencies and duty cycles and using the model to:

Process, e.g, Cut material with a consistent, predetermined distance per pulse at varying material speeds.

Process, e.g, Cut material with a consistent, predetermined depth at varying material speeds.

Process, e.g, Cut material with a consistent, predetermined width at varying material speeds.

DETAILED DESCRIPTION

Figure 1:
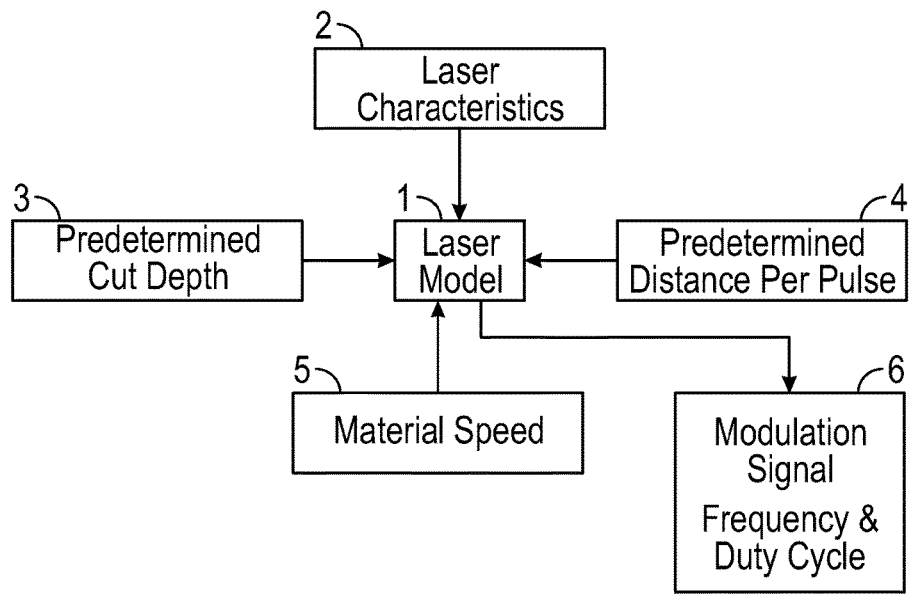
FIG. 1 shows a block diagram of the inputs and outputs of the laser model.

Laser processing systems, such as cutting control systems often operate by changing the duty cycle of a laser with respect to the material speed. The inventors found that many of these systems will not provide a consistent cut width or cut depth at different speeds.

The duty cycle of a laser is defined as the pulse duration of the laser multiplied by the pulse frequency. For instance, if the average power of the laser is solely manipulated by utilizing a linearly ramping duty cycle with a fixed low pulse frequency, the initial material acceleration is likely to realize too high of an energy density from the laser. This will cause the score in the material to be too deep. This scenario can be attributed to the nonlinearity of the peak power of individual pulses exiting the laser as the pulse width on-time ("pulse duration"), compared to the pulse width off-time changes. When the pulse duration is relatively short in relation to the pulse width off-time, the peak power of the individual pulse can be significantly higher than when the pulse duration is similar to the pulse width off-time. Since pulse energy is not captured by conventional thermopile power meters during the characterization process, the average power of the laser may be output as desired, but peak power levels of each pulse can be relatively high. In turn, the effective energy density can become higher than desired for a consistent laser process such as cutting. An embodiment described herein refers to cutting, but it should be understood that this embodiment could equally be used for controlled depth and controlled processing using lasers for scoring, welding, etching, perforating, scribing, polishing, ablating, kiss-cutting, or any other processing of a material that can be carried out by a laser.

Moreover, a fixed high pulse frequency combined with a linearly ramping duty cycle tends to yield too much pulse overlap during the initial material acceleration. This similarly can result in inconsistent cut depths across the desired range of material speeds while also hindering the ability to achieve very shallow score depths at slow speeds.

The inventors recognize that energy density into any specified volume of material needs to be kept consistent throughout all speeds in order to achieve a consistent cutting process.

Embodiments define a laser cutting system and operation that rely on a control scheme based on modeling or characterizing laser power. The system uses the model to predict the duty cycle and frequency that are necessary to command to the laser in order to achieve a consistent cut depth and cut width at varying material speeds. This is based on the recognition that every laser performs differently and that for a given modulation signal, the output power and energy characteristics often vary between similar model lasers. By measuring specific characteristics of the laser being used, more consistent performance is obtained.

In one embodiment, the characteristics that are measured for the model include the average power level output of the laser at several different frequency and duty cycle combinations. These characteristics are then used to form the model.

The model is used to interpolate parameters, including the duty cycle necessary to command to the laser for a given pulse frequency. The output of the model then creates values which are used to command the laser, via a pulse width modulation (PWM) signal, to have a specific pulse width on-time and pulse width off-time every update period (that is, every time the process is updated), which is based on the interpolated duty cycle, predetermined distance per pulse, predetermined cut depth, and material speed. The predictive nature of modeling the analog average power of the laser output with regard to various PWM signals allows for improved control of the cutting process.

The model is also used to set a distance per pulse to achieve a consistent cut depth and cut width without gaps between sequential pulses, yielding a consistent pulse overlap. The distance per pulse is defined and/or set as the ratio of the material speed divided by the pulse frequency of the laser. This distance can alternatively be set as the distance (or time) between the leading edges of two sequential pulses.

Since cut depth is dependent on the energy density of the incident laser beam, it will be directly proportional to the average power of the laser and inversely proportional to the material speed as it passes the laser. According to one embodiment, the duty cycle is calculated such that a linear relationship between average power and material speed is maintained along with the model.

Furthermore, an estimate for the desired cut depth value to be input to the model can be initially determined by empirical measurement via cross-sectional microscopy of a laser score at an arbitrary web speed while using a reasonable distance per pulse setting such that consistent pulse overlap is produced.

Both the duty cycle and pulse rate are updated concurrently every update period to obtain a consistent cut depth and cut width at varying material speeds. If only the pulse frequency is changed and the duty cycle is held constant, the cut may vary in both depth and width throughout the range of material speeds. Conversely, if only the duty cycle is changed and the pulse frequency of the laser is kept constant, the cut may vary in both depth and width as well as have gaps where the distance per pulse is not appropriately synchronized with the material speed; however, since every laser performs differently, this determination is not a straightforward task. This is described herein with reference to the drawings.

FIG. 1 shows a block diagram of inputs and outputs of a laser model used according to an embodiment. The laser model 1 includes a numerical model of the laser which defines how the specific laser responds to and processes material and is based upon laser characteristics 2. Inputs to the model 1 include a predetermined cut depth 3, a predetermined distance per pulse 4, and the material speed 5, which are shown as inputs to the laser model 1.

Figure 5:
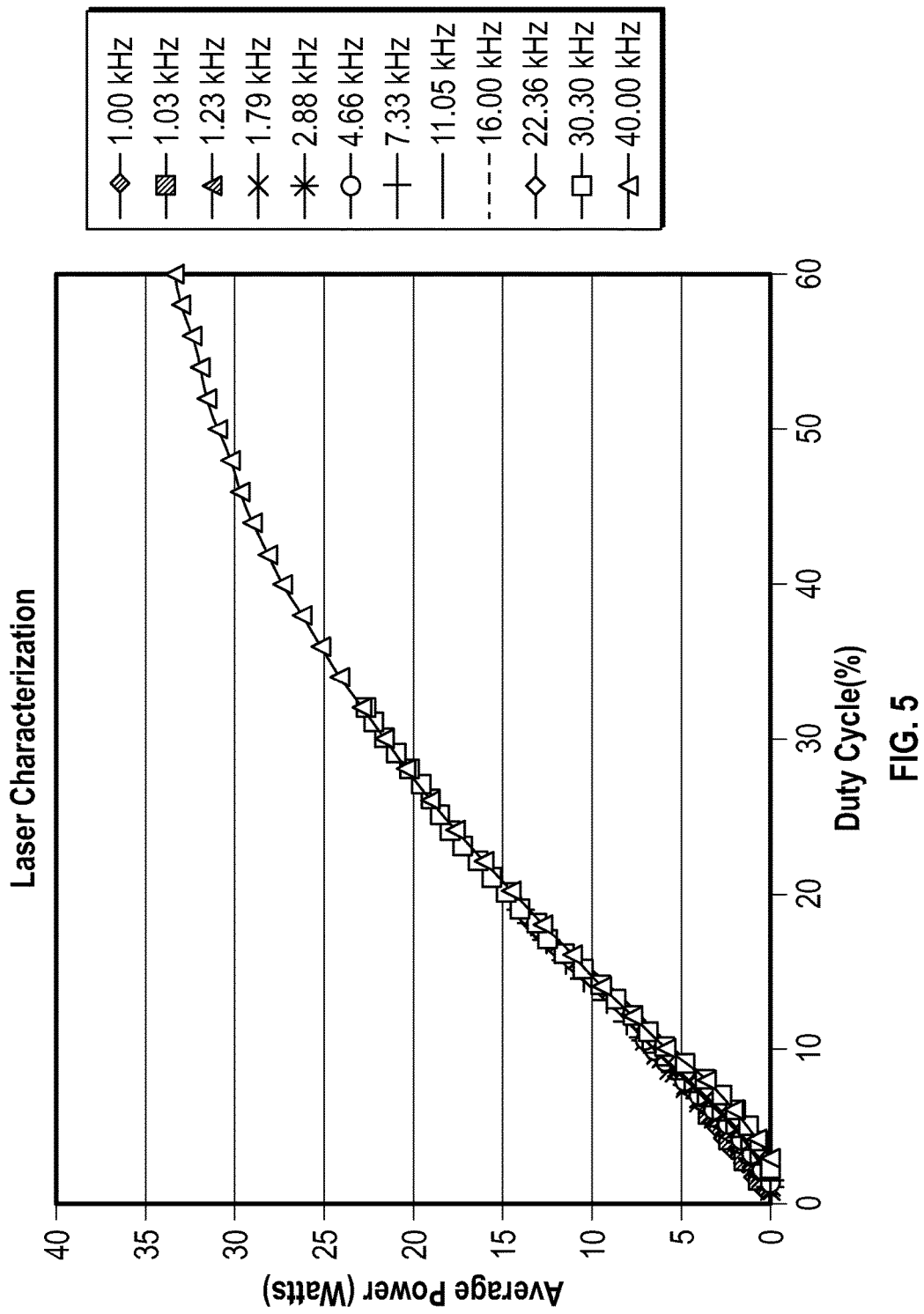
FIG. 5 portrays the characteristics of a Coherent Diamond GEM-40L $CO_2$ laser input to the control model.

In more detail, still referring to FIG. 1, the laser characteristics 2 are measured and a graph is created such as shown in FIG. 5. This graph shows a relation between duty cycle and average power (in watts) applied to the material, for each of a plurality of different frequencies. This illustrates how each individual frequency curve utilizes a unique, targeted duty cycle range to capture the most applicable range of average powers. Since the output of lasers is less reliable at lower average powers, the range of frequencies used to collect the laser characteristics 2 is weighted such that a larger amount of data is gathered near those lower frequencies.

The predetermined cut depth 3 shown in FIG. 1 is determined as a percentage of the laser's maximum power. This is entered into the laser model 1, e.g. entered by the user as part of the model creation or when using the model. Note the terms predetermined cut depth and power percentage are subsequently used interchangeably in reference to the input to the laser model 1.

The predetermined distance per pulse 4 is input into the laser model 1 to determine the amount of material travel between the leading edge of two sequential laser pulses, independent of material speed 5. The distance per pulse is considered from the material perspective. As the web speed increases, the laser pulses at a higher frequency to maintain the consistent distance between pulses as predefined by the user; although the pulse period of the PWM signal would decrease accordingly.

The material speed 5 is input into the model in real-time, determined by a controller via an encoder signal that monitors the movement of the material. Then, based upon the predetermined distance per pulse 4, the appropriate modulation or command signal 6 (frequency and duty cycle) to the laser is thereby calculated.

The calculated frequency 6 is then used along with trend lines representing each of the laser characterization curves to interpolate the appropriate duty cycle 6 and command to the laser for the given material speed 5. As the material speed 5 reaches very fast speeds, the maximum pulse frequency of the laser may be surpassed, at which point the pulse frequency is held constant and the duty cycle is continued ramping up to its respective maximum in order to maintain the linear relationship of average power with the material speed 5. Quasi-CW (continuous wave) processing ensues and a consistent cut depth and cut width is still maintained throughout the entirety of the process.

Figure 2:
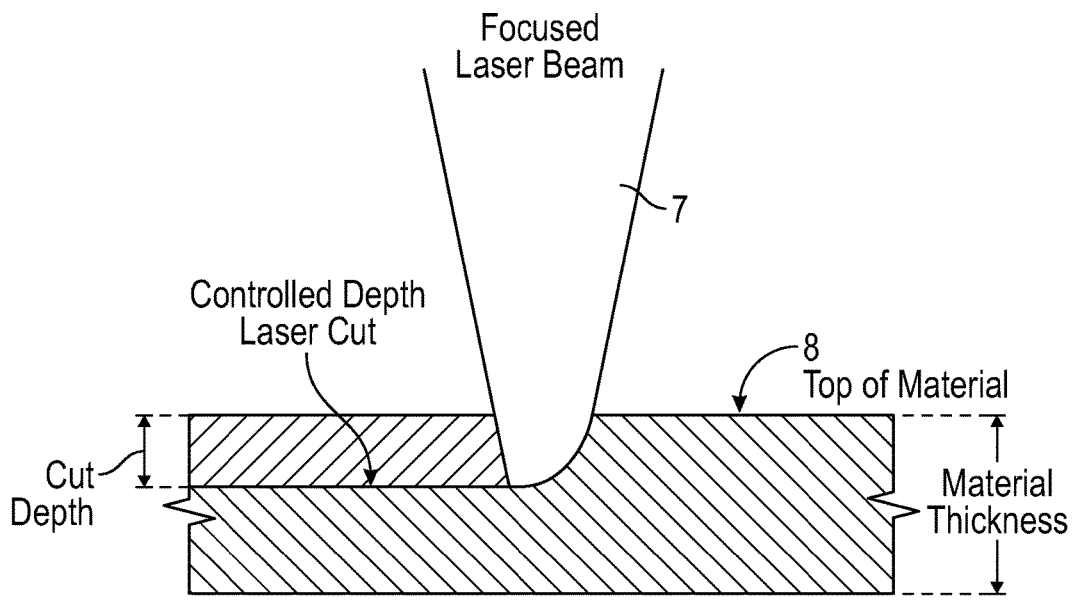
FIG. 2 shows the basic laser cutting process.

FIG. 2 shows the laser beam 7 being focused by a focusing lens, or combination of lenses, to the surface of the material 8, or near the surface of the material. The laser beam 7 does not need to be focused at the exact top of the material 8 but can be focused slightly above or below the surface of the material 8 to achieve a minimum score width per the optical design characteristics and respective power settings being used. The focused laser beam 7 is at a high enough energy density to cut the material 8. The average power of the focused laser beam 7 being output is directly controlled by the laser model by adjusting the modulation signal 6, FIG. 1, commanded to the laser.

The surface of the material 8 moves relative to the focused laser beam 7. The relative speed at which the surface is moving is used as an input 5 into the model. The laser is then commanded to output power at a specific frequency, in order to maintain a predetermined distance per pulse as explained herein with reference to FIG. 4.

The embodiment as shown in FIG. 2 can be accomplished with a laser beam 7 of any wavelength that is capable of cutting the material 8.

Figure 3:
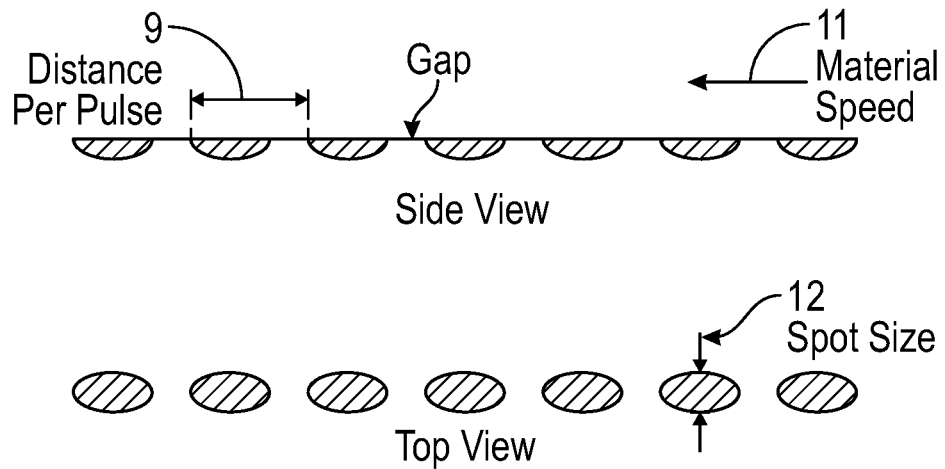
FIG. 3 provides an example of the effect seen when the laser is not modulated at a sufficient frequency to maintain a continuous cut.

FIG. 3 shows a scenario where the frequency of the laser has been commanded to be too low. There is a distance per pulse 9 shown in FIG. 3, but the frequency has been set such that there are areas 10 on the material that have not been processed by the laser, forming gaps of unprocessed material. This shows how the commanded frequency, inverse of the distance per pulse 9, needs to take into account the material speed 11, and also the spot size 12 of the focused laser beam. Note the spot size 12 is assumed circular in shape however it may become elongated, as shown in FIG. 3, due to increasing material speeds 11. The optimal distance per pulse value can be initially estimated by empirically measuring the spot size 12 at a slow material speed and approximating the desired pulse overlap percentage.

Figure 4:
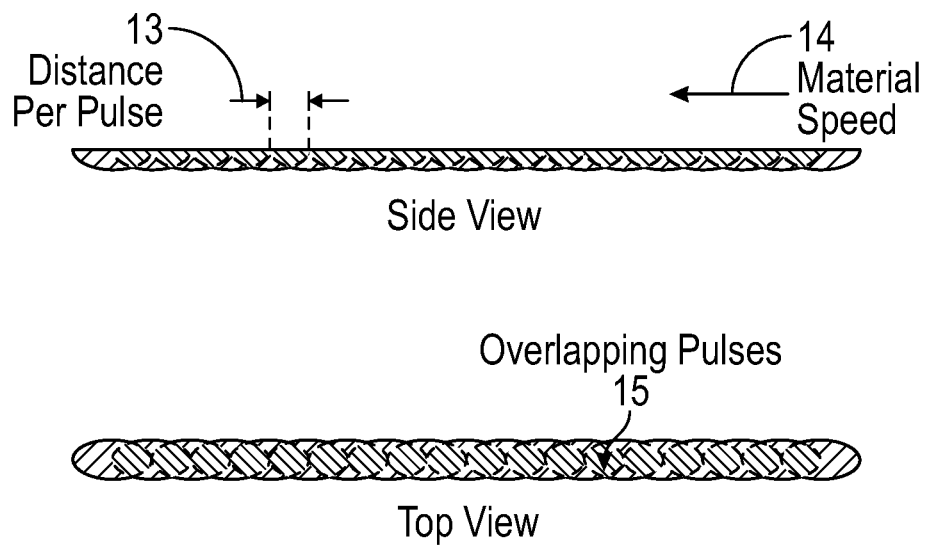
FIG. 4 offers an illustration of an ideal cut with a consistent depth and width resultant from the control model.

FIG. 4 shows a laser cut being produced with the predetermined distance per pulse 13, resultant from the laser model predictively calculating the appropriate frequency and duty cycle, and commanded to the laser to match the material speed 14. This synchronization subsequently results in overlapping pulses 15, which ultimately provides for a consistent cut width and cut depth at the predetermined cut depth, independent of material speed 14. In FIG. 4, each pulse is shown as overlapping by 50% with the adjacent pulse to form a consistent cut although other overlap percentages can be realized by simple adjustment of the distance per pulse setting.

Figure 6:
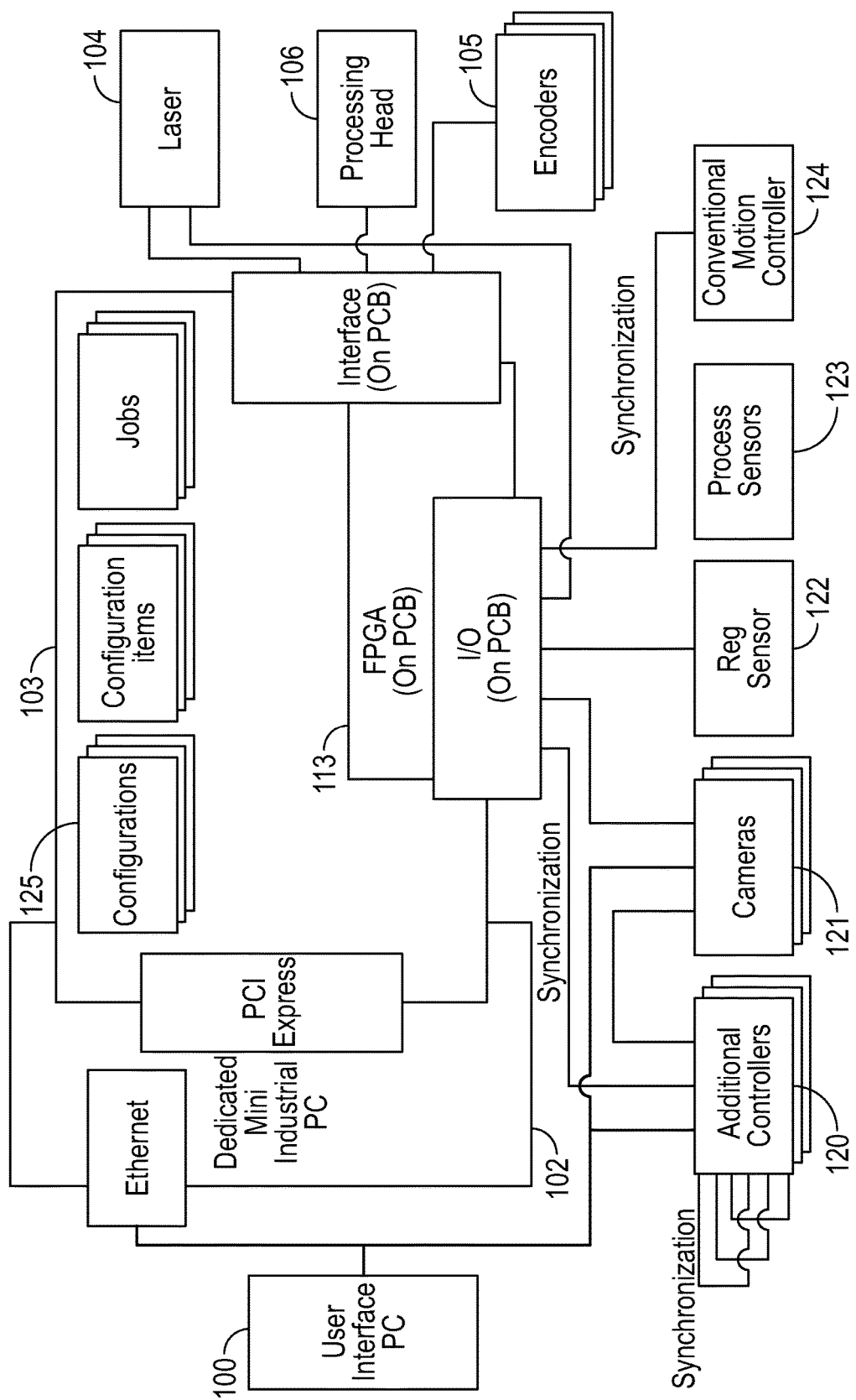
FIG. 6 is a block diagram of the system and controls.

FIG. 6 shows one embodiment of a block diagram of the system and controls used to implement the modeling of the laser output. The user interacts with the system through the GUI (graphical user interface) executing on the user interface computer 100. In this particular embodiment, the user collects the laser characteristics, shown in FIG. 1, through software executing on the user interface computer 100. The graphs of FIG. 5 are also created on the user interface computer 100. Desired values for the distance per pulse and cut depth are entered from the GUI on the user interface computer 100. Upon execution of the software running on the user interface computer 100, the collection of trend lines (referred to as a power map), predetermined distance per pulse, and programmed power percentage associated to the desired cut depth are downloaded to the dedicated mini industrial computer 102. As the system is running, the encoder signal for the web movement is input into the FPGA 113 on the control board 103. The encoder signal is then interpreted on the FPGA 113 on the control board 103 and output to the dedicated mini industrial computer 102. The mini industrial computer 102 then interpolates between the trend lines in the power map based upon the distance per pulse, power percentage, and encoder signal 5, in order to determine the appropriate accompanying duty cycle, FIG. 1, for the necessary pulse frequency. The modulation or command signal from the mini industrial computer 102 is then output to the FPGA 113 on the control board 103 which then outputs a control command defined by a frequency and duty cycle to the laser 104. The laser beam produced at the predicted output power from laser 104 is then directed to the processing head 106 which then focuses the laser beam to a higher energy density to process the material as shown in FIG. 2.

As shown in FIG. 6, the system may also be used to receive additional information from additional controllers 120, which can carry out synchronization between multiple controllers. Cameras 121 can be used to monitor the operation, and also to carry out synchronization and for quality control. Other sensors including a registration sensor 122, process sensors 123 and a motion controller 124 can also be used to monitor the process.

The PC 102 may also include a memory 125 storing different configurations, and also storing information indicative of the model, such as the characterization curves.

Figure 7:
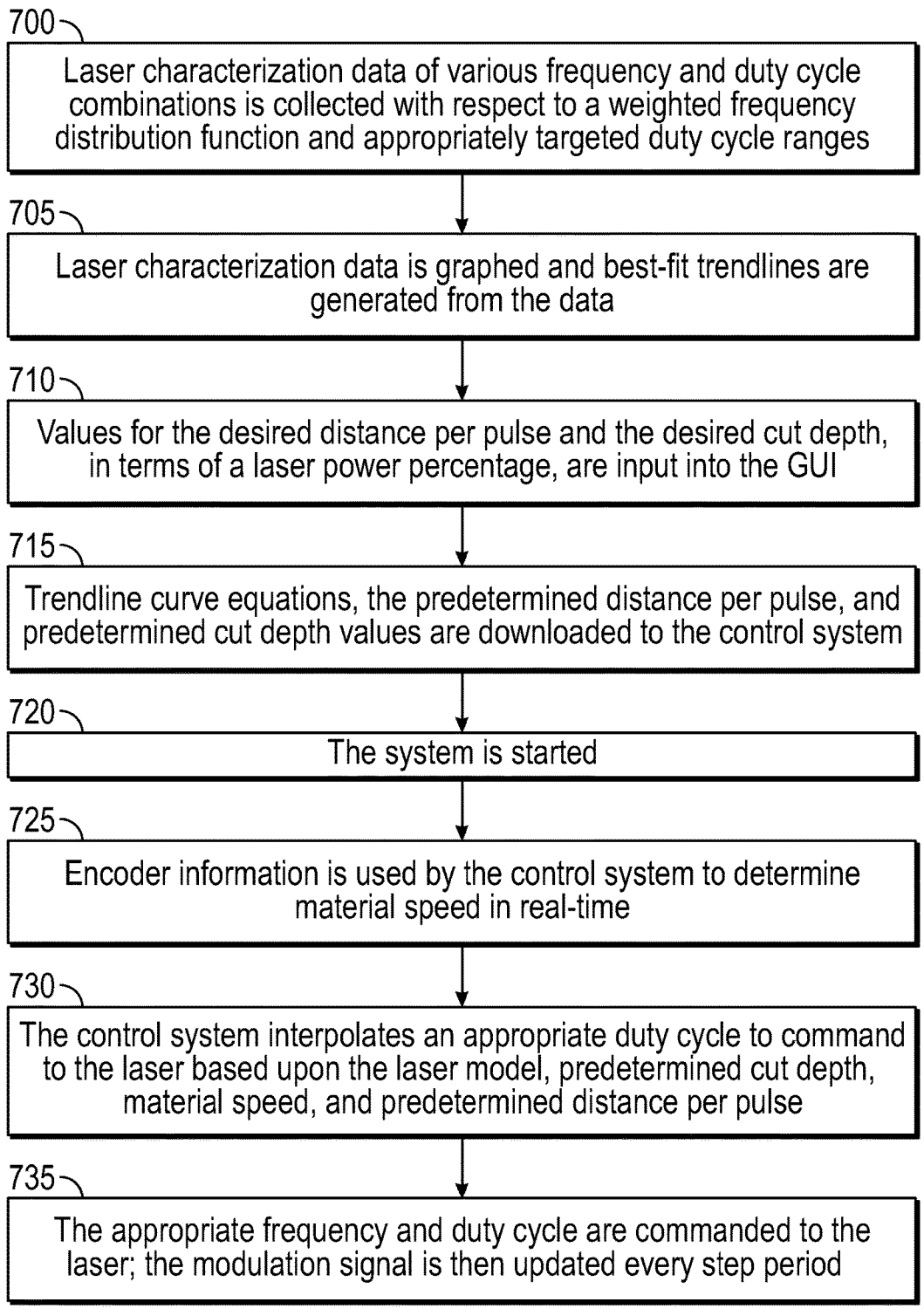
FIG. 7 is a flow diagram, depicting utilization of the laser model.

FIG. 7 illustrates a process flow that is carried out to operate using the model. This process flow, for example, can be executed by any of the processors or microcontrollers in the system. In one embodiment, for example, this can be carried out by executing on the industrial PC 102 in FIG. 6. This could alternatively be executed in any of the additional controllers 120 or in the FPGA 113.

The process begins at 700, where laser characterization data of various frequencies and duty cycle combinations is collected to create the weighted frequency distribution function shown in FIG. 5.

At 705, characterization data is graphed, and the best-fit trend lines are generated from this data. This is used at 710 to create values for the distance per pulse and desired cut depth in terms of the laser power percentage as a graphical user interface provided to the user. This is formed into equations or other forms that characterize the cut system at 715. These features can be considered as initial features.

At 720 the system is started, using the previously obtained information.

The material speed relative to the laser is determined at 725 using information from the encoder that is measuring the speed of the material or in the other embodiments by measuring a relative speed between the laser and the material.

At 730, this speed is used by the processor to interpolate a duty cycle to command the laser based on the various information. This frequency and duty cycle is then sent to the laser at 735 and used to cut or otherwise process the material.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Embodiments described above refer to cutting, but it should be understood that these embodiments could equally be used for controlled depth and controlled processing using lasers for scoring, welding, etching, perforating, scribing, polishing, ablating, or any other process of a material that can be carried out by a laser.

Other embodiments, for example, could have the power map trend lines stored on the mini industrial computer e.g., element 102 in FIG. 6 or on the control board 103 in FIG. 6. Yet another embodiment could store trend lines for a specific laser on the internet in a so-called cloud storage.

Another embodiment includes using this laser model with a laser beam motion system. With such a system, the laser, rather than the material, is moving. Therefore, there is no material speed, but the laser beam may be moving over the material, which can be referred to as a laser speed. From the perspective of the material, there would be no difference between the two cases and it would still be necessary to maintain a consistent energy density in order to maintain the proper cut depth.

Another embodiment has the laser beam motion system moving the laser beam across the material and having the material moving relative to the laser beam motion system simultaneously. This can still be considered from the perspective of the material where the combined motion between the laser and material would require a consistent energy density to maintain the proper cut depth.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, display port, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for processing a material using a laser, comprising:
    a memory, storing characterization information representing specific data characterizing a specific laser used for processing a material, where the characterization information includes a relationship between duty cycle of the laser, and average power applied to the material for the duty cycle, for each of a plurality of different duty cycles of the laser, and the relationship includes information about a nonlinearity of a peak power of individual pulses exiting the laser;
    a computer, running a program that uses said characterization information, along with a material speed at which the material will be moving relative to the laser, said computer using said characterization information and said material speed to set a laser control command which sets a spacing between leading edges of sequential pulses of energy output by the laser, that when output by the laser, creates a laser power output that has a pulse overlap between said sequential pulses which creates a consistent cut width and depth along the moving material while maintaining an amount of average power that is proportional to a speed of movement of the material at each location along the moving material and maintains a consistent amount of overlap between said sequential pulses.

2. The apparatus as in claim 1, further comprising said laser, and where said laser is a $CO_2$ laser which has at least a part of its relationship between duty cycle of operation of the laser and output power of the laser which is non-linear, and where said command causes said laser to cut said material to a consistent depth by accessing said characterization information.

3. The apparatus as in claim 1, wherein the laser is controlled using pulse width modulation to cause each pulse to overlap with each other pulse.

4. The apparatus as in claim 1, wherein said characterization information comprises a graph with the relationship between duty cycle and average power for each of a plurality of different frequencies, with each of the frequencies defining a frequency curve, and all the frequencies collectively defining a set of characterization curves stored in the memory.

5. The apparatus as in claim 1 wherein the pulses overlap by 50% to create a consistent cut.

6. The apparatus as in claim 1, wherein said computer uses a computer model created using said characterization information along with a desired distance per pulse and a desired process depth, to automatically adjust control of the laser to process the material.

7. The apparatus as in claim 6, further comprising a speed detecting part, determining a speed of movement of the material relative to the laser, and said model receives inputs including a determined speed of the material, said desired distance per pulse, and said desired cut depth, to control the laser to cut the material at varying material speed, where both the duty cycle and pulse frequency of the laser are updated concurrently at every update period to obtain a consistent cut depth and cut width at varying material speeds.

8. The apparatus as in claim 7, wherein the speed of the material comprises a speed at which the material is moving.

9. The apparatus as in claim 7, wherein the speed of the material comprises a speed at which the laser is moving.

10. The apparatus as in claim 1, wherein said laser control command is a pulse width modulated signal having a specific pulse width on-time and specific pulse width off-time that is determined automatically by the computer based on the characterization information, and based on both entered and sensed parameters.

11. The apparatus as in claim 1, wherein said characterization information stored in the memory has a greater density of data near a lower frequency and a lesser density of data near a higher frequency.

12. A method of processing a material using a laser, comprising:
    obtaining characterization information representing specific data characterizing a specific laser used for processing a material, where the characterization information includes a relationship between duty cycle of the laser, and average power applied to the material for the duty cycle, for each of a plurality of different duty cycles of the laser, and the relationship includes information about a nonlinearity of a peak power of individual pulses exiting the laser;
    controlling the laser, using said characterization information and also using a material speed at which the material will be moving relative to the laser to set laser control commands to the laser, that control automatically a duty cycle of the laser, while controlling a spacing between leading edges of sequential pulses of energy output by the laser, in a way that creates a consistent cut width and depth along the moving material and maintains a consistent amount of pulse overlap between said sequential pulses; and
    using said command to control the laser to process the material in a way that changes the material by a consistent amount while maintaining a amount of average power applied to said material that is proportional to a speed of movement of the material, at each location along the moving material and maintains and maintaining a consistent amount of overlap between said sequential pulses.

13. The method as in claim 12, further comprising said laser, and where said laser is a $CO_2$ laser, which has at least a part of its relationship between duty cycle of operation of the laser and output power of the laser which is non-linear, and where said command causes said laser to cut said material to a consistent depth by using said characterization information.

14. The method as in claim 12, wherein the laser is controlled using pulse width modulation to cause each pulse to overlap with each other pulse by a specified amount.

15. The method as in claim 12, wherein said characterization information comprises a graph with the relationship between duty cycle and average power for each of a plurality of different frequencies, with each of the frequencies defining a frequency curve, and all the frequencies collectively defining a set of characterization curves, each of the curves representing a specific average power output of the laser.

16. The method as in claim 15 wherein the pulses overlap by 50% to create a consistent cut.

17. The method as in claim 12, wherein said using the characterization information to set the spacing comprises using a computer model created by said characterization information along with a desired distance per pulse and a desired process depth, to control the laser to process the material.

18. The method as in claim 17, further comprising determining a speed of movement of the material relative to the laser, and using a determined speed of the material, along with said model, said desired distance per pulse, and said desired cut depth, to control the laser to cut the material at varying material speed, where both the duty cycle and pulse frequency of the laser are updated concurrently at every update period to obtain a consistent cut depth and cut width at varying material speeds.

19. The method as in claim 18, wherein the speed of the material comprises a speed at which the material is moving.

20. The method as in claim 18, wherein the speed of the material comprises a speed at which the laser is moving.

21. The method as in claim 12, wherein said using the command to control the laser comprises forming a pulse width modulated signal having a specific pulse width on-time and specific pulse width off-time that is determined based on the characterization information, and based on both entered and sensed parameters.

22. The method as in claim 12, wherein said characterization information has a greater density of data near a lower frequency and a lesser density of data near a higher frequency.

23. A laser processing apparatus, comprising:
a laser, which has an output which has at least a part of its output with a non-linear relationship between duty cycle of operation of the laser and output power of the laser,
said laser used for processing a material;
a memory, storing characterization information representing specific data characterizing the laser used for processing the material, where the characterization information includes a relationship between duty cycle of the specific laser, and average power applied to the material resulting from specific duty cycles, for each of a plurality of different duty cycles, and the relationship includes information about a nonlinearity of a peak power of individual pulses exiting the laser;
and
a computer, running a program that uses said characterization information as a model to set a laser control command, by receiving a speed of movement of the material relative to the laser, receiving a predetermined distance per pulse as an input from a user, receiving information indicating a desired depth for said processing, and determining said command including the computer automatically adjusting both the frequency and duty cycle of sequential pulses of energy output by the laser, and
the specific laser which operates according to said non-linear relationship to create a laser power output with an amount of average power applied to said processing that is proportional to a speed of movement of the material, at each location along the moving material.

24. The apparatus as in claim 23, where said command controls said laser to cut said material to a consistent depth.

25. The apparatus as in claim 23, wherein said laser control command operates to control the laser output with a consistent amount of pulse overlap between said sequential pulses; and outputting said command to control the laser to process the material at a consistent process amount while maintaining a consistent amount of overlap between said sequential pulses, wherein the pulses overlap by 50% to create a consistent cut.

26. The apparatus as in claim 25, wherein the laser is controlled using pulse width modulation to cause each pulse to overlap with a next pulse by a percentage specified by the user.

* * * * *